United States Patent
Provino et al.

(10) Patent No.: US 6,269,085 B1
(45) Date of Patent: Jul. 31, 2001

(54) METHOD AND APPARATUS FOR HIERARCHICAL DISCOVERY AND PRUNING OF SLOW MEMBERS OF A MULTICAST GROUP

(75) Inventors: Joseph E. Provino, Cambridge; Dah Ming Chiu, Acton; Miriam C. Kadansky, Westford; Joseph S. Wesley, Quincy, all of MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/497,443

(22) Filed: Feb. 3, 2000

(51) Int. Cl.[7] .................................................... H04L 12/28
(52) U.S. Cl. ........................ 370/256; 370/351; 370/408; 370/229
(58) Field of Search ................................. 370/351, 389, 370/400, 409, 410, 474, 475, 468, 229, 254, 232, 235, 236, 255, 256, 408

(56) References Cited

U.S. PATENT DOCUMENTS

| | | | |
|---|---|---|---|
| 5,289,460 | * 2/1994 | Drake, Jr. et al. | 370/245 |
| 5,634,001 | * 5/1997 | Auerbach et al. | 709/242 |
| 5,696,896 | * 12/1997 | Badovinatz et al. | 714/4 |
| 5,831,975 | * 11/1998 | Chen et al. | 370/256 |
| 6,104,695 | * 8/2000 | Wesley et al. | 370/216 |
| 6,151,633 | * 11/2000 | Hurst et al. | 709/235 |

* cited by examiner

Primary Examiner—Chau Nguyen
Assistant Examiner—Alexander O. Boakye
(74) Attorney, Agent, or Firm—Weingarten, Schurgin, Gagnebin & Hayes LLP

(57) ABSTRACT

A method and system for pruning slow multicast group members in a multicast group that includes a sending node and member nodes. The sending node and selected ones of the other nodes comprise repair heads of a repair tree. Each repair head has at least one child. Each of the member nodes generates a slowness metric. Each member node repair head aggregates its own slowness metric with the slowness metrics of their respective children in the tree along with a subtree flag that indicates whether the respective slowness metric is due to the reporting node or a node downstream of the reporting node. The member node repair heads propagates the largest of the aggregated slowness metrics upstream along with a subtree flag associated with the propagated slowness metric. Via this process the sending node receives the largest slowness metrics generated in respective branches of the repair tree along with corresponding subtree flags associated with the respective metrics. In response to the receipt of an indication of congestion at one or more of the member nodes when the sending node is transmitting at a minimum acceptable data rate, the sending node initiates pruning of slow group members in a predetermined manner. The globally largest slowness metric is employed in conjunction with the aggregated slowness metrics and associated subtree flags retained at the sending node and intermediate nodes to identify slow member nodes within the multicast group that should be pruned.

26 Claims, 7 Drawing Sheets

METHOD AND APPARATUS FOR HIERARCHICAL DISCOVERY AND PRUNING OF SLOW MEMBERS OF A MULTICAST GROUP

BACKGROUND OF THE INVENTION

The present invention relates to a method and system for detecting and pruning slow members of a multicast group.

The use of multicast data transmission within communication networks is well known. In a multicast transmission group one node, referred to herein as the sending node, transmits data in packets via a reliable multicast protocol to a plurality of other nodes in the multicast group. The multicast group is organized as a hierarchical repair tree as is known in the art. The repair tree includes nodes identified as repair heads that receive Acknowledgements (ACKs) and Negative Acknowledgements (NACKs) from child nodes within the repair tree. In response to the receipt of a NACK at a repair head, the repair head retransmits data packets that were not received by its children.

The data packets may be multicast by the sending node to the group members and forwarded via the repair tree nodes or alternatively via other nodes that are not nodes within the repair tree. The nodes within the repair tree include the sending node and intermediate nodes which serve as repair heads and receivers which provide ACK/NACK responses to repair heads but do not serve as repair heads. For purposes of discussion herein, it is assumed that the multicast group members and the repair tree are the same, although it is recognized that data packets may be delivered to multicast group members via nodes that are not members of the repair tree.

For purposes of reference, packets transmitted toward the sending node from the receivers or intermediate nodes are considered as being transmitted upstream or up the tree and packets transmitted from the sending node or intermediate nodes toward a receiver node are considered as being transmitted downstream or down the tree.

Typically, in multicast data transmissions, reliability support mechanisms are employed which attempt to assure that all member nodes of a multicast group receive the transmitted data. Moreover, flow control mechanisms are employed that result in the adjustment of the data transmission rate to a rate that can be accommodated by intermediate nodes and receivers. The technique of reducing the transmission rate of the sending node to a rate that can be accommodated by all intermediate and receiver nodes fails, however, when the sending node must maintain a minimum data transmission rate which exceeds the rate at which one or more nodes in the multicast group can receive data.

For the above reasons, it would be desirable to have a mechanism which provides for the detection of multicast group members which cannot receive data from a sending node at a minimum specified data rate. Additionally, it would be desirable to provide a mechanism for pruning such nodes from the multicast group so that the sending node can resume transmission at an acceptable data rate.

BRIEF SUMMARY OF THE INVENTION

Consistent with the present invention a method and system is disclosed for identifying and pruning members of a multicast group that cannot keep up with a minimum specified data transmission rate. A multicast group includes a sending node that originates a multicast packet. The sending node transmits the multicast packet via a multicast protocol to multicast group members which, in the illustrated embodiment include intermediate nodes and receiver nodes. The multicast group is organized as a repair tree with the sending node and intermediate nodes serving as repair heads for reporting lower level nodes within the repair tree. The receiver and intermediate nodes at each level of the repair tree, from time to time, forward to their respective repair heads flow control messages in the form of ACK/NACK messages to indicate whether data packets were correctly received or need to be retransmitted by the respective repair heads.

Each intermediate node and receiver within the multicast group generates a slowness metric which is representative of the ability of the respective node to receive data packets at the then current data transmission rate employed by the sending node. The flow control packets forwarded upstream by the receiver nodes and intermediate nodes include, in a preferred embodiment, a selected one of the slowness metrics generated either by the reporting node or a downstream node within the repair tree and a subtree flag that indicates whether the respective slowness metric was generated by the reporting node or a node downstream of the reporting node. Each intermediate node aggregates and maintains a list of its slowness metric along with slowness metrics and subtree flags received from its respective reporting downstream children. Each intermediate node forwards upstream to its repair head the largest slowness metric of its aggregated list along with a subtree flag that indicates whether the slowness metric contained within the flow control message is due to the reporting node or a downstream node. In this manner, the sending node receives the largest slowness metric within the multicast group. Additionally, the receiver and intermediate nodes each forward upstream congestion packets which indicate when a congestion condition has been detected at the respective node. Congestion packets received at a repair head are forwarded upstream so that the sending node receives notification of the congestion condition.

If the sending node has reduced the transmission rate to the minimum acceptable transmission rate and congestion packets are still being received by the sending node, such is indicative of a pruning condition. Upon detection of a pruning condition, the sending node prunes its children within the repair tree that have a slowness metric greater than or equal to the largest slowness metric observed by the sending node minus a predetermined tolerance. Additionally, the sending node inserts into a multicast data packet a pruning flag along with the largest slowness metric observed by the sending node and optionally, an indication of the tolerance to be applied in pruning nodes within the multicast group. This packet is referred to as a pruning indication packet. The pruning indication packet is preferably reliably multicast to the multicast group members. In response to receipt of the pruning indication packet, for each active child associated with the respective repair head, the respective intermediate node determines whether the respective child was responsible for generation of the slowness metric received from that child by inspection of the subtree flag received from that child. If the child was responsible for the generation of the respective slowness metric, the respective intermediate node determines whether the slowness metric received from the respective child is greater than the largest observed slowness metric minus the predetermined tolerance. If the slowness metric generated by the respective child is larger than the largest observed slowness metric minus the predetermined tolerance, the respective child is pruned from the multicast group. This process is repeated for each child of an intermediate node so that all "slow" child nodes are pruned from the multicast group. Once the slow intermediate and receiver nodes are pruned from the multicast group, operation of the multicast group may continue at an acceptable transmission rate at or above the minimum acceptable transmission rate.

BRIEF DESCRIPTION OF THE SEVERAL VIEWS OF THE DRAWING

The invention will be more fully understood by reference to the following Detailed Description of the Invention in conjunction with the Drawing of which.

DETAILED DESCRIPTION OF THE INVENTION

Figure 1:
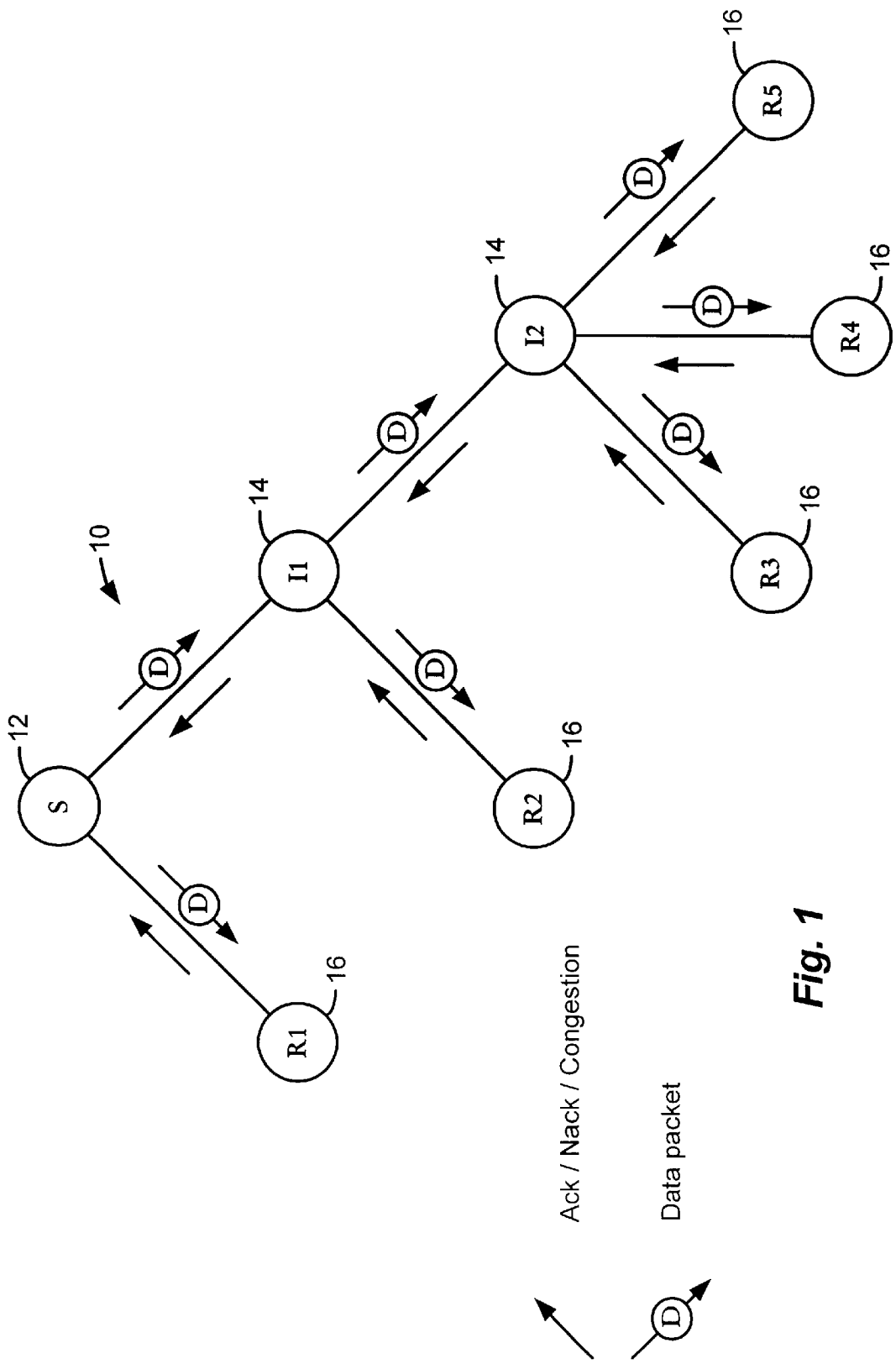
FIG. 1 is a pictorial representation of a multicast group including a sending node, a plurality of intermediate nodes and a plurality of receiver nodes, wherein the multicast group is operative in a manner consistent with the present invention.

A method and system for performing pruning of slow nodes in a multicast group consistent with the present invention is disclosed. The multicast group is organized as a repair tree and includes a sending node, intermediate nodes and receiver nodes. The sending node and intermediate nodes comprise repair heads and retransmit packets to their respective children upon receipt of flow control messages indicating that multicast packets were lost or have not been correctly received. The pruning of slow nodes from the multicast group occurs when the multicast group is operating at a minimum acceptable transmission rate and an indication of congestion is received at the sending node. Referring to FIG. 1, an exemplary multicast group is depicted which is operative in a manner consistent with the present invention. The multicast group includes a sending node 12 one or more intermediate nodes 14 and a plurality of receivers or leaves 16. The sending node 12, intermediate nodes 14 and receivers 16 of the multicast group 10 are organized into a repair tree with the sending node 12 at the root of the tree. The sending node 12 and the intermediate nodes 14 comprise repair heads within the repair trees. The receivers 16 are coupled to either the sending node 12 or one of the intermediate nodes 14 as shown in the exemplary multicast group depicted in FIG. 1. The intermediate nodes 14 are coupled to the sending node 12 or other intermediate nodes 14 in the repair tree also as illustrated in FIG. 1. It should be appreciated that a multicast group may comprise a repair tree which includes no intermediate nodes 14 in which case all receivers 16 employ the sending node 12 as their repair head.

The sending node 12, intermediate nodes 14 and receiver nodes 16, may comprise a computer or processing element, a personal digital assistant (PDA), an intelligent networked appliance, a network node such as a router or network switch, a controller or any other device capable of performing the multicast and other functions herein described. In a preferred embodiment, the sending node 12, the intermediate nodes 14 and the receiver nodes 16 each include a processor which is operative to execute programmed instructions out of an instruction memory. The instructions executed in performing the functions herein described may comprise instructions stored within loadable or non-volatile program code. The memory may comprise random access memory or a combination of random access memory and read only memory. The sending nodes 12, the intermediate nodes 14 and the receiver nodes 16 include a network interface for coupling the respective nodes to a network such as a Local Area Network, a Wide Area Network, the Internet, or any other appropriate network which may be employed for the multicasting of data packets from a sending node to multicast group members. The nodes may optionally include secondary storage for storing programs operative to execute the presently described.

The sending node 12 preferably transmits multicast data packets for receipt by all of the members of the multicast group via a reliable multicast protocol. For example, the Pragmatic General Multicast (PGM) protocol, the Reliable Multicast Transport Protocol (RMTP) the Tree Based Reliable Multicast Protocol (TRAM) (See Chiu, Hurst, Kadansky, Wesley, "TRAM: A Tree-based Reliable Multicast Protocol", Sun Labs Technical Report, TR-98-66, July 1998 at http://www.sun.com/research/techrep/1998) or any other suitable multicast protocol may be employed. The data packets may be delivered to the various group members via the repair heads as illustrated in FIG. 1, or alternatively, delivered to the group members via other nodes (not shown). The reliable multicast protocol is preferably employed in an effort to assure delivery of data packets to all group members.

The receivers 16 and intermediate nodes 14 regularly send acknowledgements (ACKs) or negative acknowledgements (NACKs) to their repair heads, to report the progress of data reception. Additionally, if the current rate of multicast transmission is too fast, a receiver 16 or intermediate node 14 transmits a congestion packet upstream to the respective repair head or the sending node as applicable. Congestion packets received at an intermediate node are generally forwarded upstream to the respective intermediate nodes repair head. The congestion packet may provide an indication that the congested node has correctly received fewer packets within a specified multicast session interval than had been received in the immediately prior session interval. Alternatively, the congestion packet may be indicative of any other suitable measure of congestion. Upon receiving an indication of congestion, the respective intermediate node 14 forwards the congestion packet upstream. Duplicate indications of congestion may be suppressed by a repair head that receives from a downstream node the duplicated indication of congestion within a congestion evaluation window. Based upon the aggregated congestion information, the sending node may adjust the data transmission rate.

The multicast group 10 is typically assigned a minimum acceptable data transmission rate and a maximum acceptable data transmission rate as administrative functions when the multicast group is established. The minimum acceptable data transmission rate is typically selected as the lowest data transmission rate required to satisfy the operational objectives for the respective multicast session. The maximum acceptable data rate is selected based upon the amount of network bandwidth that will be made available to the respective multicast session. When the transmission of data packets within the multicast group 10 commences, an initial transmission rate is typically selected which is between the minimum and the maximum acceptable data transmission rates. If a receiver 16 or intermediate node 14 becomes congested, it generates and forwards a congestion packet upstream to its repair head as described above and the sending node 12 eventually receives an indication of the congestion condition from one of its children within the repair tree. In response to the receipt of a congestion packet at the sending node 12, the sending node 12 reduces the data transmission rate. If congestion packets continue to be received at the sending node 12, the sending node 12 may decrease the data transmission rate until it reaches the minimum acceptable data transmission rate for the multicast group. If the sending node reduces the data transmission rate to the minimum acceptable data transmission rate and receives an indication of congestion via a congestion packet, the sending node may elect to initiate pruning of slow intermediate nodes 14 and slow receivers 16 within the multicast group.

Figure 2:
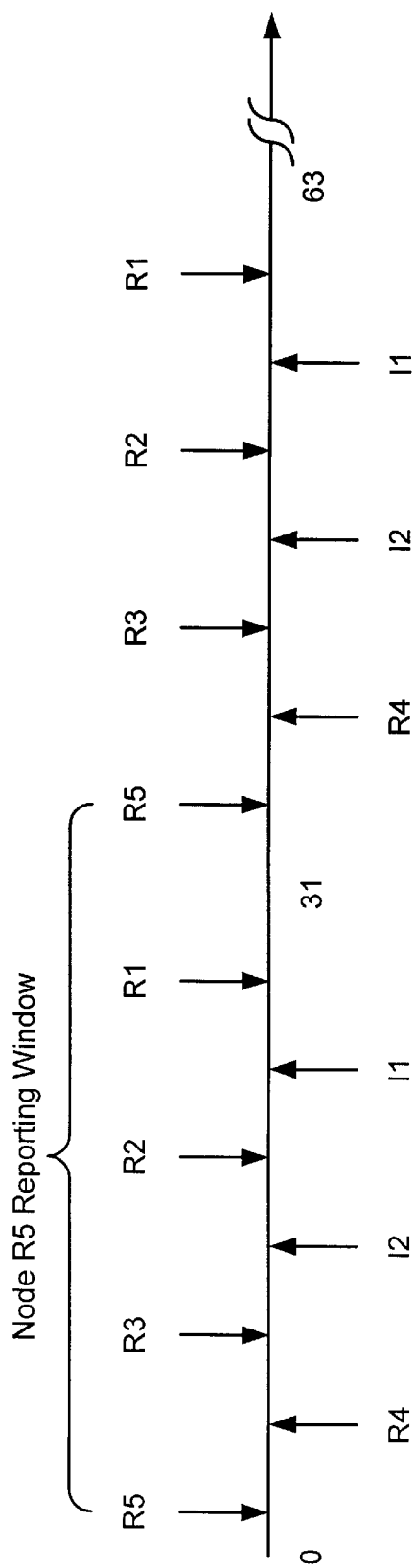
FIG. 2 is an illustrative timing diagram depicting timing of Acknowledgement (ACK) and Negative Acknowledgement (NACK) transmissions in the multicast group depicted in FIG. 1.

FIG. 2 depicts exemplary timing of flow control messages which comprise Acknowledgement (ACK) messages and Negative Acknowledgement (NACK) messages that are transmitted upstream by the respective receiver nodes 16 and the intermediate nodes 14 in the illustrative multicast group 10 depicted in FIG. 1 to their respective repair heads. The X axis in FIG. 2 corresponds to increasing message sequence numbers within a given multicast session and the vertical arrows illustrate when respective nodes within the multicast group are intended to transmit their respective ACK/NACK messages. For purposes of reference, the location of sequence numbers 0, 31 and 63 are shown in FIG. 2 along the X axis. As depicted in FIG. 2, the timing of transmission of the ACK/NACK messages are preferably staggered in time to avoid receipt of numerous ACK/NACK messages at the same time at any one intermediate node or at the sending node. For example, receiver R5 may transmit its initial ACK/NACK message within the respective multicast session upon detection of the transmission of the fourth multicast message within a multicast session. The receiver R5 could transmit its subsequent ACK/NACK message a specified number of messages following the initial ACK/NACK message transmission. The period between flow control messages typically transmitted by any one receiver node 16 or intermediate node 14 in the multicast group is referred to as a reporting window. A reporting window for node R5 is depicted in FIG. 2 for purposes of illustration. In the illustration depicted in FIG. 2, each receiver node 16 and intermediate node typically generates a flow control message following receipt of every 32 multicast data packets within a multicast session as determined by message sequence numbers within the respective multicast data packets. While the illustrative reporting window depicted in FIG. 2 comprises a 32 message wide window, the reporting window may be varied based upon design objectives. Accordingly, in the present example R5 would transmit a subsequent ACK/NACK message upon detection of the thirty-sixth data packet within the respective multicast session. If a data packet having a sequence number greater than the thirty-sixth data packet is received before the thirty-sixth data packet, the ACK/NACK message is transmitted by the respective node upon detection of the greater sequence number. The ordering of ACK/NACK messages transmitted by receivers 15 and intermediate nodes 14 in FIG. 2 is arbitrary and is shown to illustrate the nature of ACK/NACK message reporting within the multicast group.

As known in the art, the ACK message indicates that the respective receiver 16 or intermediate node 14 received all intervening messages. The NACK message indicates that all expected packets were received within the reporting interval up through a particular message sequence number. A bit mask is provided with the NACK message which includes an identification of missing packets. The reporting window, which in the present embodiment is depicted as 32 packets, may be set at any desired width and is shown for purposes of illustration rather than limitation.

Figure 3:
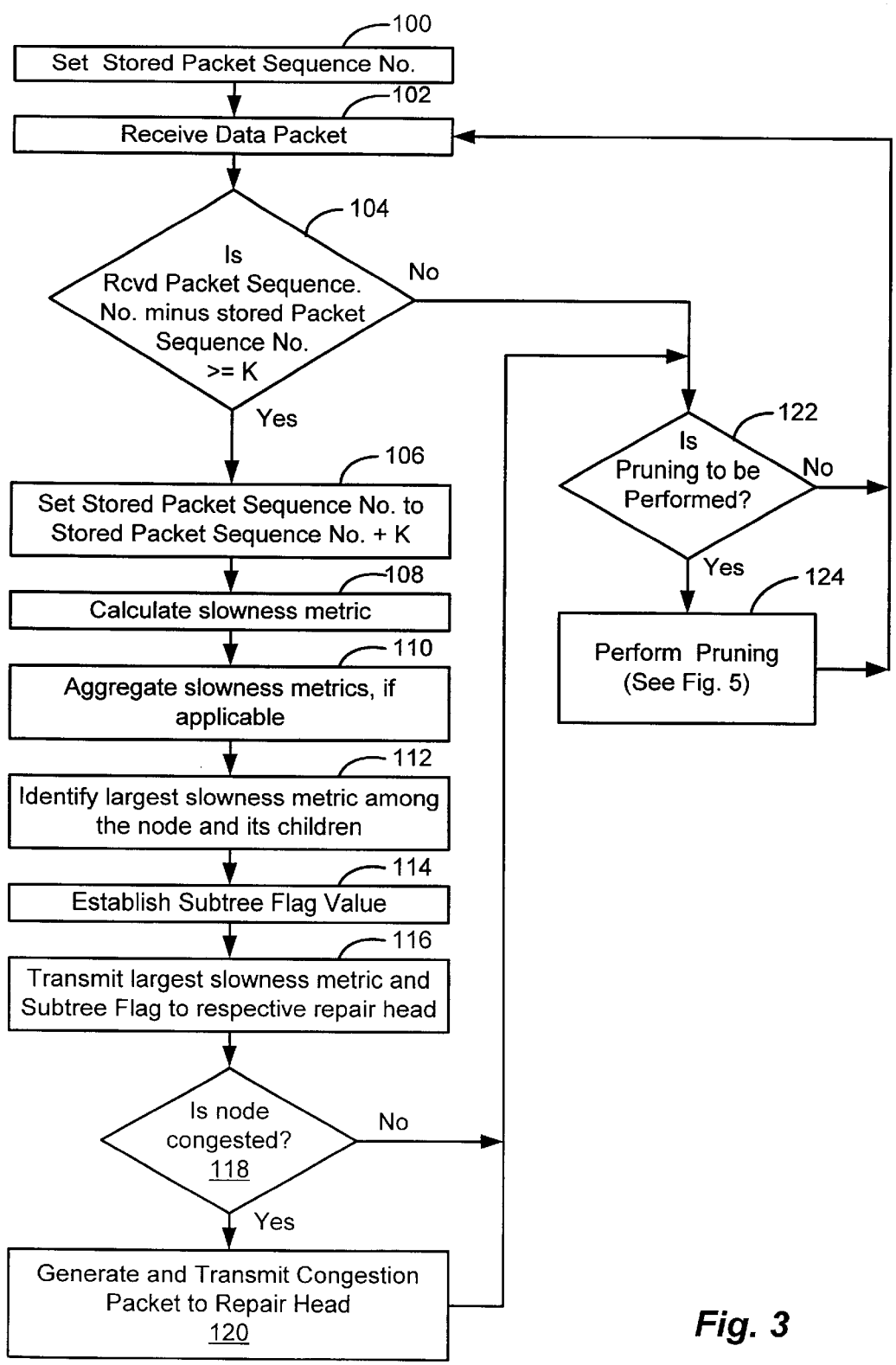
FIG. 3 is a flow diagram depicting an exemplary method of operation of a receiver or intermediate node in the multicast group of FIG. 1.

FIG. 3 depicts the operation at the intermediate nodes 14 and the receiver nodes 16. More specifically, FIG. 3 depicts the generation of a slowness metric for use in the presently disclosed pruning process. In general, each receiver node 16 and intermediate node 14 (collectively referred to as "non-sending nodes"), from time to time, generates a slowness metric which is representative of the respective nodes ability to receive multicast session packets at the then current data transmission rate. In the disclosed embodiment, the nodes having larger slowness metrics are less able to keep up with the data transmission rate established by the sending node 12 than nodes with lower slowness metrics. The intermediate nodes 14 and the receiver nodes 16 aggregate in a list the slowness metrics from reporting nodes in the repair tree (if any) with their own respective slowness metric. It should be noted that receivers 16 do not have any reporting nodes and thus, the list at a receiver node comprises the slowness metric generated by that receiver. Generally periodically, each non-sending node compares its own slowness metric with the received slowness metrics and selects the largest slowness metric of the aggregated group of slowness metrics. Each non-sending node periodically transmits the largest slowness metric upstream to its repair head along with a subtree flag that indicates whether the node transmitting the slowness metric (herein referred to as the reporting node) generated the slowness metric or whether the slowness metric was generated downstream of the reporting node. More specifically, the subtree flag is set to a first state if the reporting node is the cause of the slowness metric and to a second state if a node downstream of the reporting node generated the slowness metric. In a preferred embodiment, the slowness metric and the subtree flag are transmitted by each of the non-sending nodes upstream to their respective repair heads in the ACK/NACK message although such information may be transmitted in a message distinct from the ACK/NACK message. By performing the above process at each receiver 16 and intermediate node 14, the largest slowness metric(s) and associated subtree flags propagate to the sending node 12.

The above-described process and other operational aspect of the non-sending nodes are illustrated in greater detail in FIG. 3. Referring to FIG. 3, as depicted in step 100, a stored packet sequence number is initialized to a starting value. The stored packet sequence number represents an offset from the initial message within a multicast session and is employed to achieve desired staggering of the ACK/NACK responses at the respective node with respect to other nodes within the multicast group. As shown at step 102, the node receives a multicast data packet belonging to a particular multicast session. The data packet includes a sequence number that is employed for message ordering. This sequence number is also employed for keeping track of evaluation windows as herein described. As illustrated in decision step 104, an inquiry is made whether the sequence number in the received data packet minus the stored packet sequence number is greater than or equal to K where K is the width of the reporting window established for ACK/NACK responses. More specifically, K specifies the number of messages within the multicast session that are normally received between the transmission of ACK/NACK messages by the respective node. For example, if the number of messages to be received between ACK/NACK messages is 32, the value K equals 32.

The width of the ACK/NACK window in a given system is specified based upon specific design tradeoffs. More particularly, if a short ACK/NACK reporting window is selected, greater network bandwidth will be consumed as a result of the more frequent reporting of ACK/NACK messages by the respective multicast group members and additionally, greater processing overhead will result at the respective repair heads as a consequence of the need to perfrom processing in response to the more frequently received ACK/NACK messages. More frequent ACK/NACK messages, however, allows more rapid recovery in the event of incorrectly received or lost multicast data packets. Conversely, less frequent ACK/NACK reporting utilizes less network bandwidth and reduces the processing overhead at the respective member nodes, however, the longer ACK/NACK period will result in less frequent retransmission and recovery from incorrectly received or lost multicast data packets.

Since it is recognized that any particular message within the multicast sequence may not be received in sequence, the decision step 104 inquires whether the received packet sequence number minus the stored packet sequence number is greater than or equal to the window width K. If it is determined in inquiry step 104 that the received packet sequence number minus the stored packet sequence number is not greater than or equal to K, control passes to inquiry step 122. If it is determined at step 104 that at least K packets within the multicast session have been received since the generation of the last ACK/NACK message, the stored packet sequence number is reset to equal the stored packet sequence number plus the value K as shown at step 106. As illustrated at step 108, the respective receiver node 16 or intermediate node 14 calculates a slowness metric. The slowness metric constitutes a measure of the respective node's ability to receive multicast session messages at the then current data transmission rate. For example, the slowness metric may comprise the number of messages in the last reporting window that were lost or received incorrectly, the number of messages within the past n reporting windows that were lost or received incorrectly, a percentage of incorrectly received or lost messages within a predetermined number of reporting windows, or any other suitable slowness metric which is indicative of the inability of the respective node to receive the multicast session messages transmitted by the sending node 12 at the then current data transmission rate. The respective node then aggregates its own slowness metric with the slowness metrics received from its downstream children in the repair tree as shown in step 110 and, as depicted in step 112, identifies the largest slowness metric within the aggregated group of slowness metrics. It is noted that receiver nodes 16 do not have any children in the repair tree and thus receiver nodes 16 do not receive slowness metrics from any downstream nodes. Thus, the aggregated group of slowness metrics for a receiver node 16 comprises solely the slowness metric for the respective receiver node 16.

As illustrated in step 114, the respective node next generates a subtree flag value that indicates whether the largest slowness metric within the aggregated group of slowness metrics is attributable to the respective node or to a node downstream of the respective node. If the largest slowness metric is attributable to the respective node, the subtree flag to be transmitted upstream by the respective node (the reporting node) is set to a first state (e.g. "0"). If the largest slowness metric is attributable to a node downstream of the respective node, the subtree flag is set to a second state (e.g. "1"). As depicted in step 116, after ascertaining the largest slowness metric of the aggregated slowness metrics and setting the subtree flag, as described above, the reporting node transmits the largest slowness metric of the aggregated group of slowness metrics and the appropriate subtree flag upstream to its repair head in its flow control message or alternatively in a another packet employed for this purpose. The repair head will be either an intermediate node 14 or the sending node 12 depending upon the location of the reporting node within the repair tree.

Following step 116 control passes to inquiry step 118 in which a determination is made whether the respective node is congested. The node is determined to be congested in the presently disclosed embodiment if the node has correctly received fewer packets within a current congestion evaluation window interval than had been received in the immediately prior congestion evaluation window interval. The congestion evaluation interval may comprise one or more ACK/NACK reporting intervals, such as illustrated in FIG. 2, or alternatively, an interval unrelated to the ACK/NACK reporting interval. For example, if the congestion evaluation window is 64 packets wide, and congestion is evaluated every 32 packets, an indication of congestion is generated if, in the immediately prior evaluation window, n packets were incorrectly received or lost and in the present evaluation window n+1 or more packets were incorrectly received or lost. It is noted in the above example, that the evaluation window is a rolling window that is greater in width than the width of the reporting window. The width of the congestion evaluation window, however, may be selected based upon specific design objectives and may equal, or be greater than, the reporting window. In a preferred embodiment, the congestion evaluation window is dynamically calculated. The minimum width of the congestion evaluation window is this preferred embodiment is equal to the ACK/NACK reporting window and the maximum width of the congestion evaluation window equals five times the width of the ACK/NACK reporting window. The width of the congestion evaluation window is increased linearly by a specified number of packets, up to the maximum width of the congestion evaluation window, each time an ACK message is received without an indication of congestion. The width of the congestion evaluation window is decreased by the number of incorrectly recieved or lost packets when congestion is detected at the respective member node. Other bases for determining that a node is congested may be employed.

In the event a node determines that it is congested, it forwards a congestion packet to its repair head 14. If it is determined that the respective node is not congested, control passes to decision step 122. If it is determined in step 118 that the respective node is congested, the node generates a congestion packet and transmits the congestion packet upstream to its repair head as illustrated in step 120. The congestion packet is processed at the repair head as described in connection with FIG. 3a. After the congestion packet is transmitted to the repair head, control passes to step 122.

At inquiry step 122 a determination is made whether pruning should be performed. This determination is made, in a preferred embodiment, by determining whether the multicast data packet received per step 102 contains a pruning flag that is set. The manner in which the pruning flag is set within a multicast data packet by the sending node 12 is described below in connection with FIG. 4. If the pruning flag is set, such is indicative that the sending node 12 has received at least one congestion packet while operating at the minimum acceptable data transmission rate. If it is determined in step 122 that the pruning flag is set, the respective intermediate node 14 performs pruning in accordance with the steps illustrated in FIG. 5. Since receiver nodes 16 have no children in the multicast repair tree, they need not perform the pruning steps. If it is determined in step 122 that the pruning flag is not set, control returns to step 102 to await receipt of another multicast data packet within the multicast session.

Figure 3A:
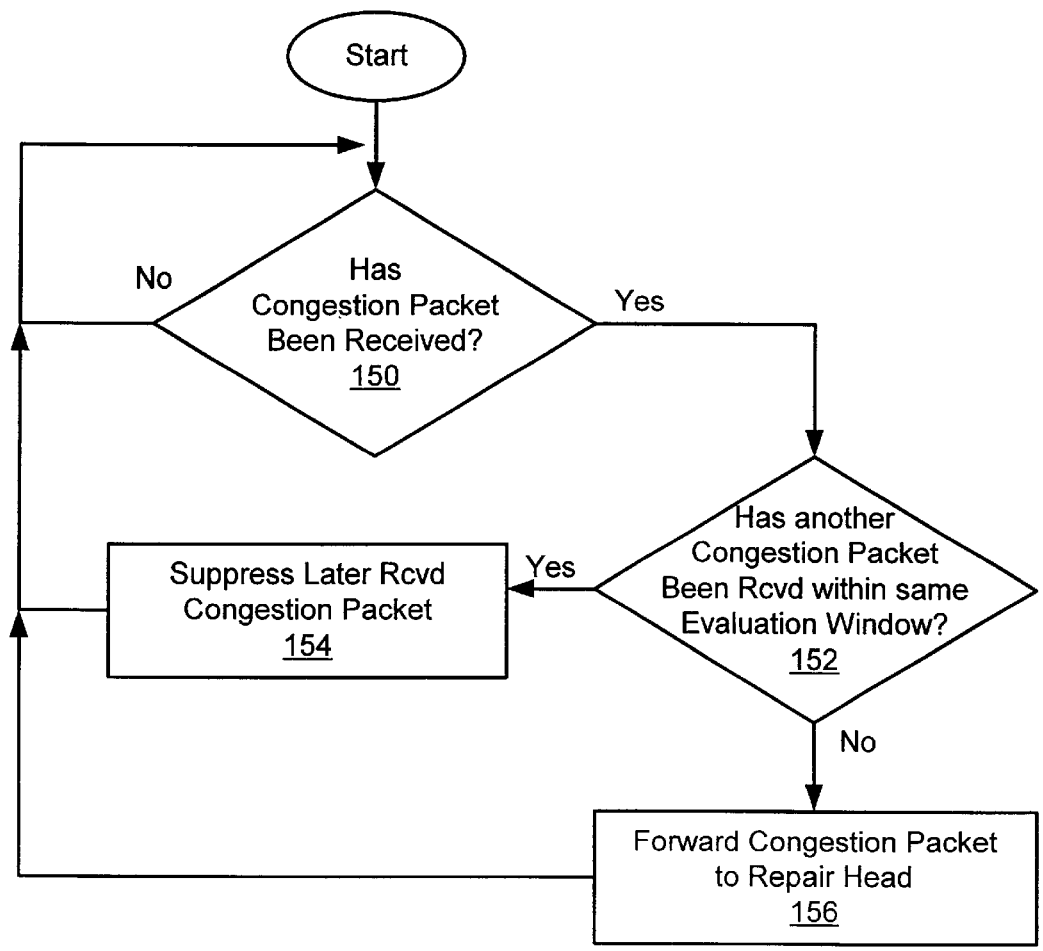
FIG. 3a is a flow diagram depicting operation of an intermediate node of FIG. 1 upon receipt of a congestion packet from a downstream node.

FIG. 3a illustrates the manner in which congestion packets are generated and forwarded upstream within the repair tree of the multicast group 10. Referring to FIG. 3a, as depicted in step 150, a determination is made whether a congestion packet has been received at the respective intermediate node from a downstream node within a congestion evaluation window. If no congestion packet has been received from a downstream node, control returns to step 150 to await receipt of a congestion packet. If it is determined in step 150 that a congestion packet has been received at the respective intermediate node 14, control passes to step 152. It should be noted that receiver nodes 16, may generate congestion packets, however, receiver nodes 16 will never receive congestion packets since they have no downstream nodes. At step 152, a determination is made whether the node has received another congestion packet from a downstream node within the congestion evaluation window. If the respective intermediate node 14 has already received another congestion packet during the current congestion evaluation period, the node suppresses the transmission of the congestion packet upstream as depicted in step 154 and control passes to step 150 to await receipt of another congestion packet. Thus, as illustrated in step 152, if at least one congestion packet has been transmitted upstream within the congestion evaluation window, transmission of other congestion packets upstream are suppressed during that congestion evaluation window. If it is determined in step 152 that no other congestion packets have been received for the respective congestion evaluation window, the respective intermediate node 14 forwards the received congestion packet upstream to its repair head as indicated in step 156 and control returns to step 150 to await receipt of another congestion packet.

It should be noted that while in the presently disclosed embodiment indications of congestion are transmitted by receiver nodes 16 and intermediate nodes 14 in congestion packets, congestion information may be included within the ACK/NACK messages transmitted by the respective receiver nodes 16 and intermediate nodes 14 of the multicast group 10. In the above described manner, indications of congestion propagate upstream through the multicast tree for receipt by the sending node 12.

Figure 4:
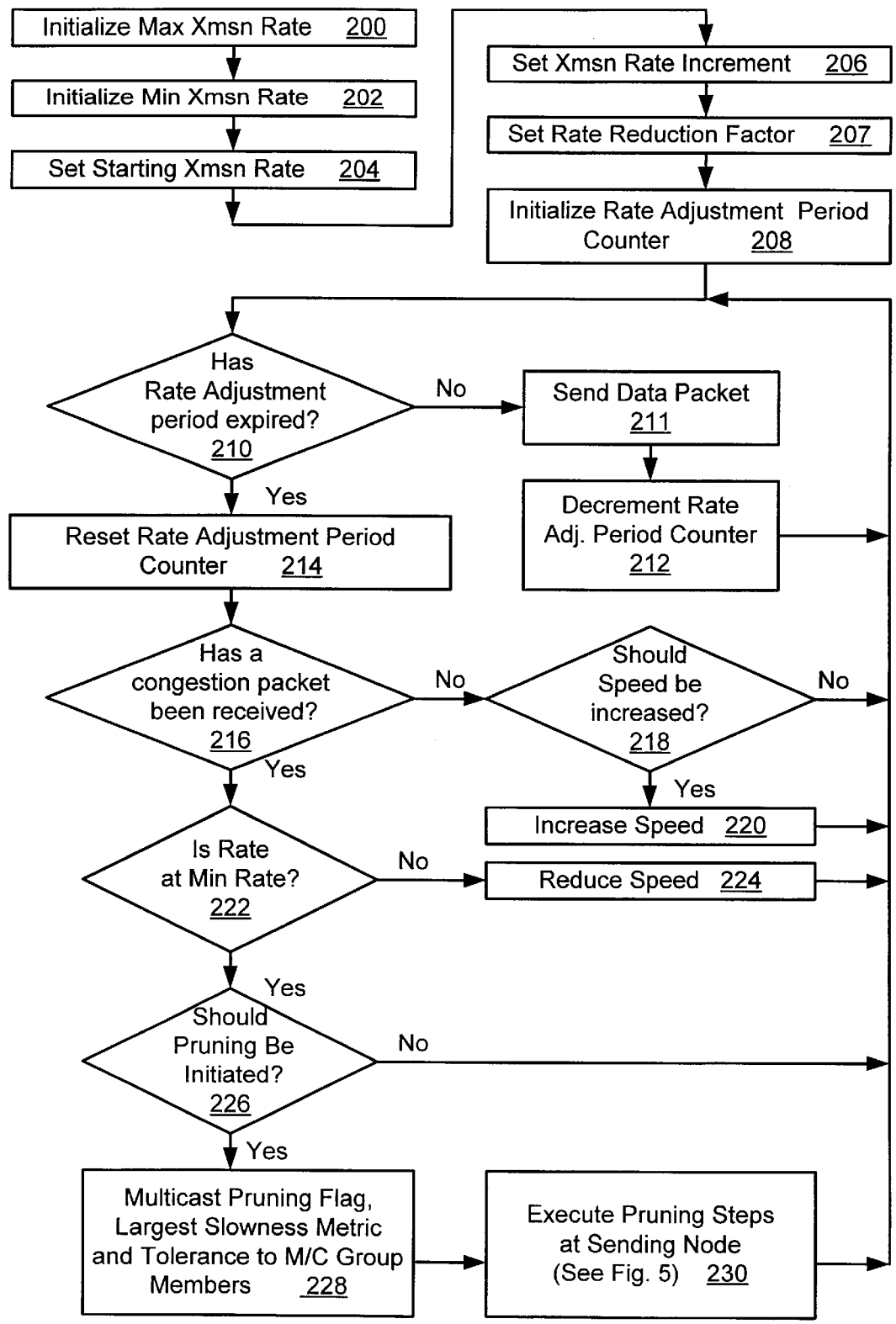
FIG. 4 is a flow diagram depicting an exemplary method of operation of the sending node in the multicast group depicted in FIG. 1.

The operation of an exemplary sending node that is operative in a manner consistent with the present invention is depicted in the illustrative flow diagram of FIG. 4. Referring to FIG. 4, as indicated in step 200, a maximum acceptable transmission rate is established for the multicast session. Additionally, as indicated at step 202, a minimum acceptable transmission rate is established for the multicast session. Further as depicted in step 204, a starting transmission rate is established for the session. Typically, the initial starting rate is set slightly higher than, or at, the minimum acceptable transmission rate. As indicated at step 206, a starting speed increment is established and as shown at step 207 a speed reduction factor is established. The starting speed increment represents the rate increase that will be made by the sending node in the event the sending node does not receive any congestion packets from the multicast group members within a predetermined period. The speed reduction factor specifies the factor by which the data transmission rate at the sending node 12 will be reduced upon an indication of congestion, subject to the constraint that the data transmission rate may not be reduced below the minimum acceptable transmission rate. More specifically, while the rate is typically increased linearly in the absence of receipt of congestion packets by the sending node 12, the transmission rate is decreased multiplicatively upon recognition of congestion by the sending node. For example, the transmission rate may be divided by 2 upon the recognition of congestion by the sending node. The sender will only slow down once per each windowing period. As indicated in step 208, a rate adjustment period counter is initialized. The rate adjustment period counter establishes the evaluation period at which rate adjustments may be made. Typically, the period counter is set to the size of the window which, in the illustrated embodiment depicted in FIG. 2, corresponds to 32 session messages.

As illustrated in step 210, inquiry is made at the sending node 12 whether a rate adjustment period has expired, i.e. whether the sending node has transmitted the number of messages which constitute a window since the last rate adjustment evaluation was performed. If the rate adjustment period has not expired, the sending node 12 multicasts a data packet to the multicast group members via a reliable multicast protocol as depicted in step 211 and the rate adjustment period counter is decremented as illustrated in step 212. Control then returns to step 210. If the rate adjustment period counter indicated has decremented to a predetermined value (e.g. the rate adjustment period counter has decremented to zero) such indicates that it an analysis should be performed to see if the data transmission rate should be adjusted. The rate adjustment period counter is reset to the initial value as illustrated in step 214. Inquiry is made at the sending node 12 whether a congestion packet has been received within the respective congestion evaluation window as depicted in 216. If the inquiry reveals that no congestion packets have been received by the sending node 12 within the respective congestion evaluation window, inquiry is made whether the rate should be increased as depicted in step 218. The determination of whether the rate should be increased may be made based upon the absence of congestion packets for a predetermined period or in accordance with any suitable technique known in the art. If it is determined as a result of such inquiry that the transmission rate should not be increased, control returns to step 210. If it is determined that the transmission rate should be increased, the transmission rate is increased by the transmission increment set in step 206, as depicted in step 220. Control then returns to step 210.

If it is determined in step 216 that a congestion packet has been received at the sending node 12 within the respective congestion evaluation period, inquiry is made whether the data transmission rate is at the minimum acceptable transmission rate as illustrated in step 222. If the current transmission rate is not at the minimum transmission rate, the transmission rate is reduced as depicted in step 224. In a preferred embodiment of the invention, the sending node 12 data transmission rate is reduced on a multiplicative basis using the rate reduction factor set in step 207. The transmission rate, however, is not reduced below the minimum acceptable transmission rate set in step 202. Following the reduction in transmission rate as per step 224, control passes to step 210. If it is determined in step 216 that a congestion packet has been received within the respective congestion evaluation period and it is determined in step 222 that the current transmission rate is at the minimal acceptable transmission rate, inquiry is made in step 226 whether pruning should be initiated. This inquiry may comprise a determination of whether a congestion packet has been received by the sending node 12 while the sending node 12 is operating at the minimum acceptable transmission rate. Alternatively, the sending node may delay the initiation of pruning. Pruning may then be initiated if a congestion packet is received in a predetermined number of congestion evaluation periods following the transition to the minimum acceptable transmission rate. If it is determined in step 226 that pruning should not be initiated, control passes to step 210. If it is determined by the sending node 12 that pruning should be initiated the sending node sets a pruning flag in a data packet and multicasts the data packet to the multicast group members. Additionally within the data packet containing the pruning flag, the sending node includes the largest slowness metric that it received and optionally includes a tolerance value to be used during the pruning process as described below. If the tolerance value is not intended to be conveyed in the data packet containing the pruning flag, the tolerance value may be transmitted to the respective repair heads at the time of the setup of the respective repair head within the multicast group. As depicted in FIG. 4 at step 230, the sending node 12 then executes the pruning steps depicted in FIG. 5 and control returns to step 210.

Figure 5:
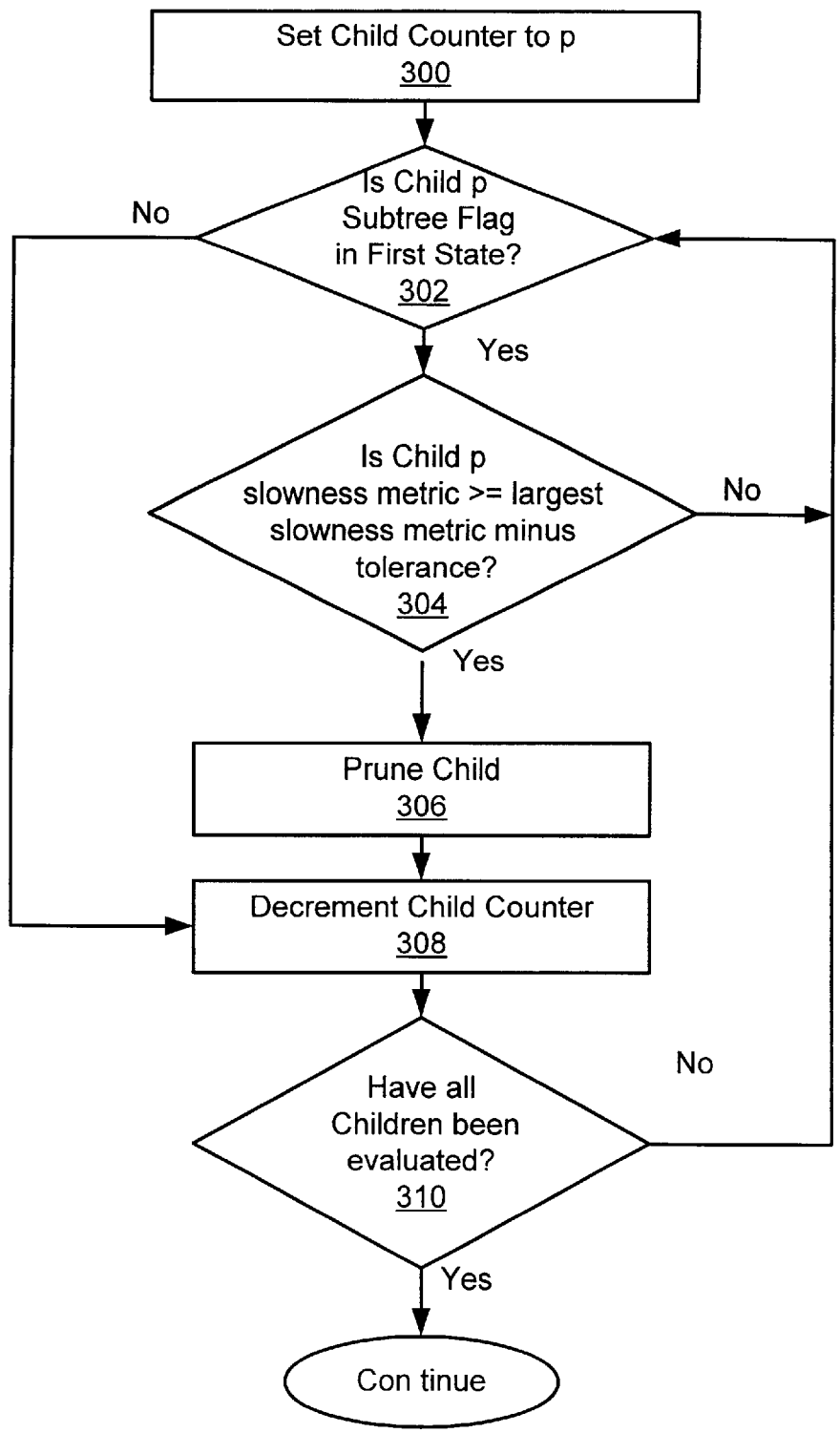
FIG. 5 is a flow diagram depicting an exemplary method of operation at the sending node and intermediate nodes in response to an indication that pruning of the multicast group should be performed.

The pruning steps are performed at the sending node 12 in response to a determination that pruning should be initiated at that node or at an intermediate node 14 in response to the receipt of a data packet that includes a pruning flag. Illustrative steps for performing pruning which are executed at the sending node 12 or an intermediate node 14 are depicted in FIG. 5. Referring to FIG. 5, a child counter is initiated to equal the number of children coupled to the sending node 12 or the respective intermediate node 14 as depicted in step 300. This counter is employed to permit the pruning steps to be evaluated with respect to each of the children coupled to the respective repair head. For purposes of illustrating the pruning operation assume that a repair node has two children coupled to it. In such event the number of children equals 2 and p is set to 2. As depicted in step 302, inquiry is made whether the subtree flag that was received from the child specified by the child counter, i.e. child 2, is in the first state. If the received subtree flag is in the first state, this indicates that the slowness metric received from that child was generated by that child rather than a node downstream of that child. Assuming it is determined that the subtree flag for child 2 is in the first state, inquiry is next made in step 304 whether the slowness metric that was received from child 2 is close to or greater than the largest observed slowness metric. The largest observed slowness metric is the largest slowness metric that propagated upstream to the sending node 12. If pruning is being performed at the sending node 12, the largest observed slowness metric is used by the sending node 12 during the pruning analysis. If pruning is being performed at the intermediate nodes, the respective node uses the value of the largest observed slowness metric that was conveyed from the sending node 12 in a data packet along with the pruning flag per step 228 of FIG. 4.

The determination of whether the slowness metric received from the respective child is close to or greater than the largest observed slowness metric may be made by determining whether the slowness metric received from that child is greater than or equal to the largest observed slowness metric minus a tolerance value. The tolerance value generally specifies how far below the largest slowness metric may be and still be pruned during the pruning process. In a preferred emodiment, the tolerance value is set to a value to accomodate normal variations in the generated slowness metrics over time. For example, assume that it takes one second for a slowness metric to propagate from a node to the repair head and another second for the largest observed slowness metric to be propagated to the repair head responsible for the pruning of the node that generated the slowness metric. In this period of time, it is possible that the node that originally generated slowness metric the slowness metric may have improved slightly. In such event, if the tolerance value were not employed, pruning of the node would not occur. By employing the slowness value appropriately, based upon the expected variations in slowness metrics, slow nodes may still be pruned via appropriate selection of the tolerance value.

If it is determined in step 304 that the child's slowness metric is greater than or equal to the largest observed slowness metric minus the tolerance value, the child is pruned from the multicast group as illustrated in step 306. Following the pruning of the child per step 306, the child counter is decremented as illustrated in step 308 and inquiry is made in step 310 whether all children of the respective node have been evaluated. This determination may be made by inspection of the child counter value. If not all children have been evaluated, control passes to step 302 to analyze whether the next child of the respective node should be pruned.

If it is determined in step 302 that the subtree flag received by the respective node is not in the first state, such is indicative that the slowness metric associated with that subtree flag is due to a node downstream of the child node. Accordingly, the child node is not pruned and the child counter is decremented as depicted in step 308. As discussed above, a determination is made whether all children have been evaluated for pruning as shown in step 310. If all children have been evaluated for pruning, processing continues as illustrated in FIG. 3 or FIG. 4 as applicable.

When a child of a node within the multicast group is pruned from the multicast tree, that child node no longer participates as a member of the multicast group. Accordingly, the child that is pruned from the multicast tree no longer transmits ACK/NACK messages upstream to its repair head and no longer generates congestion packets or forwards congestion packets upstream that are received from downstream nodes.

Since the exact timing for receipt of a data packet containing a pruning flag cannot be predicted, it is possible that a child may be pruned from the multicast group before receiving that data packet from the sending node 12. In such event, the child may, based upon specific design objectives either disregard the pruning flag and not proceed to prune downstream nodes or alternatively, continue with the pruning operation.

Figure 6:
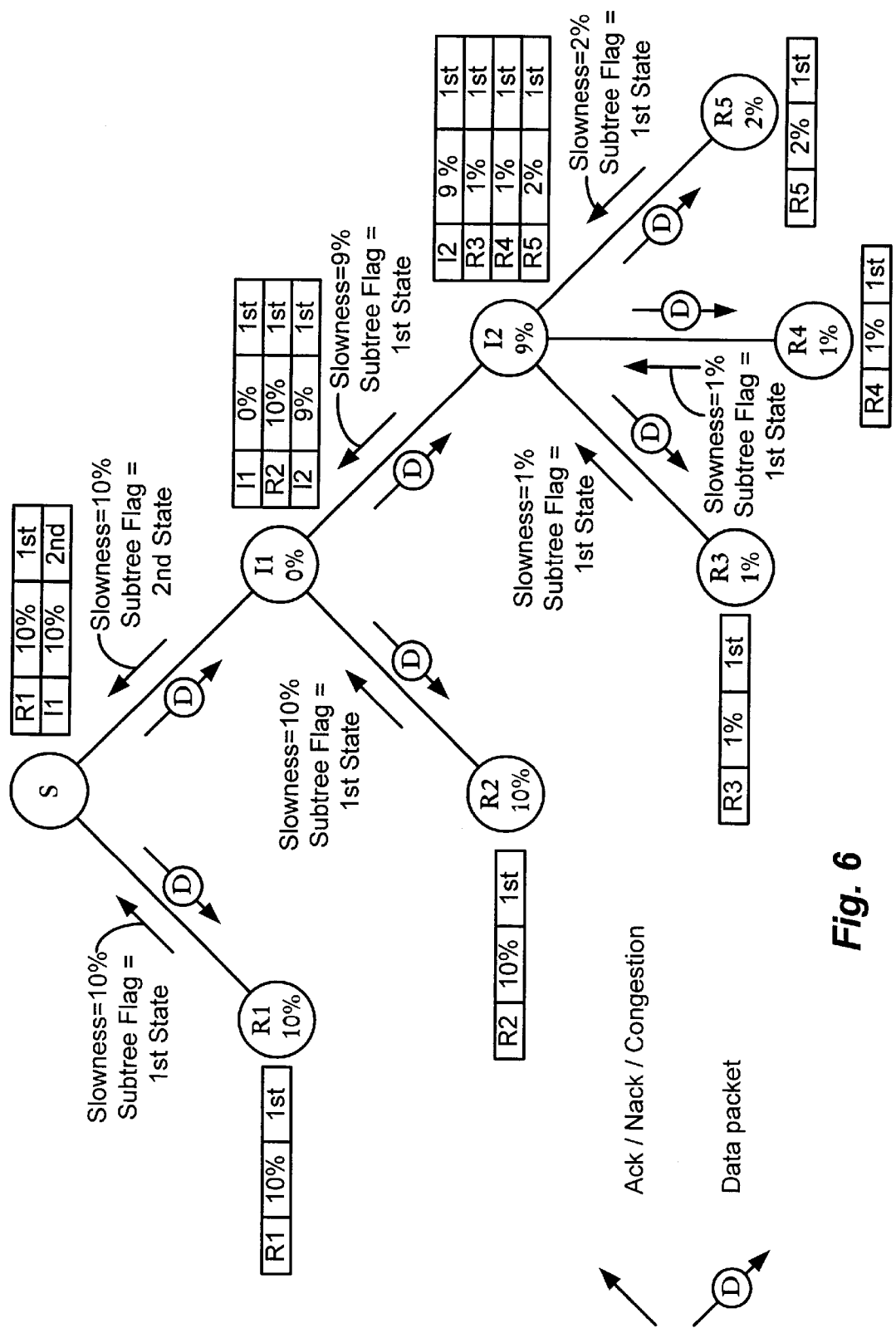
FIG. 6 is a pictorial representation of the multicast group of FIG. 1 further illustrating the operation of the presently disclosed pruning technique.

FIG. 6 depicts an exemplary multicast group and is intended to illustrate a method of pruning slow multicast nodes in a manner consistent with the present invention. For purposes of illustration, slowness metrics are assumed for each intermediate node and receiver. The slowness metric for receiver R1 is 10%, the slowness metric for R2 is 10%, the slowness metric for receiver R3 is 1%, the slowness metric for receiver R4 is 1%, the slowness metric for receiver R5 is 2%, the slowness metric for receiver I1 is 0% and the slowness metric for receiver I2 is 9%. The slowness metric in the illustrative example represents the percentage of packets that were received incorrectly or lost within a predetermined number of multicast session windows. As depicted in FIG. 6, receiver R3 forwards a slowness metric of 1% to its repair head I2 along with a subtree flag which is in the first state since the receiver R3 was responsible for the slowness metric of 1%. Similarly, the receiver R4 forwards a slowness metric of 1% to its repair head I2 along with a subtree flag of the first state which indicates that receiver R4 was responsible for the generation of the slowness metric of 1%. Finally, receiver R5 forwards to repair head I2 a slowness metric of 2% along with a subtree flag in the first state which indicates that the slowness metric was generated by the receiver R5.

The repair head or intermediate node I2 has a slowness metric of 9%. The slowness metrics for the intermediate node I2 and the children of I2 are aggregated at node I2 as illustrated in FIG. 6. The node I2 ascertains the largest slowness metric within the aggregated group and forwards that slowness metric to its repair head I1, along with a subtree flag of the first state which indicates that the slowness metric of 9% was generated by the node I2. Additionally, receiver R2 forwards to intermediate node I1 its slowness metric of 10% along with a subtree flag of the first state which indicates that the slowness metric was generated by the receiver R2. The intermediate node I1 aggregates its slowness metric of 0% with the slowness metrics received from its children, R2 and I2. The intermediate node I1 then ascertains the node that generated the largest slowness metric within the aggregated group and forwards the largest slowness metric to its repair head. In the present example, intermediate node I1 forwards the slowness metric of 10% to the sending node S along with a subtree flag of the second state which indicates that the slowness metric was not due to the reporting node I1. Additionally, the receiver R1 forwards a slowness metric of 10% to the sending node S along with a subtree flag of the first state which indicates that the slowness metric is due to the reporting node R1. The sending node S ascertains the largest observed slowness metric received from multicast tree members, which, in the present example, is 10%.

Pruning in a manner consistent with the present invention is further illustrated by reference to FIG. 6. Assuming that the sending node S receives a congestion packet at a time when it is operating at the minimum acceptable data transmission rate, the sending node S determines whether any of its children within the repair tree should be pruned. More specifically, the sending node S determines whether nodes R1 or I1 should be pruned. The sending node first determines whether the subtree flag received from node R1 is in the first state or the second state. Since the subtree flag received from node R1 is in the first state, indicating that the slowness metric was generated by the node R1, the sending node determines whether the R1 slowness metric is greater than or equal to the largest observed slowness metric minus the predetermined tolerance. Assume for purposes of this example that the tolerance is 1.5%. Since the R1 slowness metric of 10% is greater than or equal to the largest observed slowness metric (10%) minus the tolerance (1.5%), node R1 is pruned from the multicast group by the sending node. The sending node next determines whether node I1 should be pruned. Since the subtree flag received from node I1 is set to the second state, node I1 is not pruned. Having considered all of its children within the repair tree, the sending node multicasts the pruning indication packet to the multicast group members via the multicast protocol. In one embodiment, each of the intermediate nodes performs pruning as described above, whether or not the respective intermediate node 14 has been pruned. In another embodiment, each intermediate node 14 performs pruning of its children in the repair tree only if it has not itself been pruned from the multicast group. Assuming for purposes of illustration that all intermediate nodes perform the pruning analysis, the following would occur. Node I1 would prune node R2 since the subtree flag received from node R2 is of the first state and the slowness metric received from R2 is greater than or equal to 8.5% (i.e. 10%–1.5%). Additionally Node I1 would prune node I2 since the subtree flag received by node I1 from node I2 is of the first state and the slowness metric of 9% received from node I2 is greater than or equal to the largest observed slowness metric (10%) minus the tolerance (1.5). Finally node I2 would not prune any of its children, (nodes R3, R4, R5) since the slowness metrics received from these nodes at node I2 are not greater than the largest observed slowness metric minus the tolerance value.

While in the above-described the largest generated slowness is the metric indicative of the node which is most likely to lose or incorrectly receive packets, it should be appreciated that a slowness metric having the smallest value may be generated which is indicative of the node which is most likely to lose or incorrectly receive packets.

Additionally, while in the the illustrative embodiment, a child of a repair head is pruned if the child's slowness metric is greater than or equal to the largest observed slowness metric minus the tolerance value, it should be appreciated that any suitable pruning criteria may be employed. For example, the child may be pruned based upon the crteria that the child's slowness metric is greater than the largest observed slowness metric.

While in the above-described embodiment, the largest observed slowness metric is piggybacked in a multicast data packet along with the pruning flag and optionally, the tolerance value, it should be recognized that this information may be transmitted to the multicast group members in a dedicated packet. Additionally, as indicated above, the tolerance value may be provided to a group member upon initialization of the member within the multicast group.

Additionally, during normal operation, when the sending node 12 is transmitting packets at a data transmission rate above the minimum acceptable data rate, the sending node periodically sends a message to the group members to restart the computation of the slowness metrics and subtree flags for the multicast group. By restarting this process periodically, discovery of a slow multicast group member that joined the multicast group later than the rest of the group may be accomplished more rapidly. After sending the restart message, the sending node grants a grace period during which the sending node refrains from setting the prune flag transmitting the prune flag to the multicast group. The grace period may be set to allow enough time for slowness metrics to be recalculated and propagated up the multicast tree. The grace period may be adjusted under program control although in a preferred embodiment this period has been set to ten (10) seconds. It should further be noted that the grace period may be set by the sending node dynamically using an appropriate measure such as the number of new multicast group members. For example, as the number of new multicast group members increases, the grace period may be increased. By setting the grace period to a sufficiently large value, an application can effectively disable the pruning mechanism.

Alternatively, the intermediate nodes 14 and receiver nodes 16 may maintain a weighted average of their respective slowness metrics calculated over a predetermined number of reporting intervals with ascribed weightings applied to the various slowness metrics. The respective nodes may then utilize the weighted average slowness metric in the aggregated list maintained in the respective node. By utilizing the weighted average of slowness metrics calculated at the respective nodes instead of the single slowness metric calculated for a reporting interval, the need to restart the discovery process in order to rapidly discover slowness metrics generated by new multicast group members is avoided.

The ordering of the steps within the flow diagrams herein presented is for purposes of illustration only. It should be appreciated that any suitable ordering of steps may be employed to accomplish the presently disclosed functions.

Additionally, it should be appreciated that the minimum and maximum data transmission rates, the tolerance value, weightings employed in the generation of a slowness metric based upon a weighted average calculation, the ACK/NACK reporting window width and/or the congestion evaluation interval may be statically assigned or dynamically adjusted based upon an analysis of selected network operational parameters.

Those skilled in the art should readily appreciate that computer programs operative to perform the functions herein described can be delivered to the sending node 12, the intermediate nodes 14 and/or receiving nodes 16 in many forms; including, but not limited to: (a) information permanently stored in a non-writable storage media (e.g. read-only memory devices within a computer such as ROM or CD-ROM disks readable by a computer I/O attachment; (b) information alterably stored on writable storage media (e.g. floppy disks, tapes, read/write optical media and hard drives); or (c) information conveyed to a computer through a communication media, for example, using baseband or broadband signaling techniques, such as over computer or telephone networks via a modem. In addition, it should be appreciated that the presently described methods may be implemented in software executing out of a memory on respective client, file or group server processors. Alternatively, the presently described functions may be embodied in whole or in part using hardware components such as Application Specific Integrated Circuits (ASICs), state machines, controllers or other hardware components or devices, or a combination of hardware components and software processes without departing from the inventive concepts herein described.

Those of ordinary skill in the art should further appreciate that variations to and modifications of the above-described methods and systems for granting access to a computer resource may be made without departing from the inventive concepts disclosed herein. Accordingly, the invention should be viewed as limited solely by the scope and spirit of the appended claims.

What is claimed is:

1. A method for pruning multicast group members within a multicast group comprising a sending node and member nodes wherein said sending node is operative to transmit multicast data packets to said member nodes and said sending node and selected ones of said member nodes comprise repair heads of a repair tree and wherein each of said repair heads has respective child nodes, said method comprising:

generating a slowness metric at a plurality of said member nodes indicative of the respective member nodes inability to receive multicast data packets at a data transmission rate employed by the sending node;

at each of said plurality of member nodes, selectively propagating one of said generated slowness metrics up the repair tree to the respective repair head along with a subtree flag having one of a first state that indicates that the propagated slowness metric was generated by the propagating node and a second state that indicates that the slowness metric was generated by a member node other than the propagating node, such that one of said generated slowness metrics associated with a member node least able to receive data packets at said data transmission rate is received by said sending node along with the associated subtree flag generated by the respective child of the sending node;

generating a first pruning signal in response to receipt by said sending node of an indication of congestion at a member node at a time when the sending node is transmitting at a minimum acceptable data transmission rate; and in response to receipt of said first pruning signal, pruning from said multicast group each child of said sending node that forwarded to said sending node a slowness metric having a specified relationship with respect to said one of said slowness metrics and a subtree flag of said first state.

2. The method of claim 1 wherein said one of said generated slowness metrics is the largest of said generated slowness metrics.

3. The method of claim 1 wherein said one of said generated slowness metrics is the smallest of said generated slowness metrics.

4. The method of claim 2 wherein said pruning step, comprises the step of pruning from said multicast group each child of said sending node that forwarded to said sending node a slowness metric having a value greater than or equal to the largest of said generated slowness metrics minus a predetermined tolerance value.

5. The method of claim 1 wherein said pruning step, comprises the step of pruning from said multicast group each child of said sending node that forwarded to said sending node a slowness metric having a value greater than the largest of said generated slowness metrics minus a predetermined tolerance value.

6. The method of claim 1 wherein said step of selectively propagating comprises the steps of:

at each of said plurality of member nodes which is not a repair head, forwarding the slowness metric generated by the respective member node to the corresponding repair head along with said subtree flag of said first state; and at each of said plurality of member nodes which is a repair head:

generating a list that includes slowness metrics received from other member nodes which are children of the respective member node along with the associated subtree flags received from the respective children of the respective member node and the slowness metric generated by said respective member node which is a repair head;

selecting the slowness metric within said list indicative of the member node least likely to be able to correctly receive multicast data packets at said data transmission rate;

generating a subtree flag of the first state in the event the selected slowness metric was generated by the respective member node which is a repair head and generating a subtree flag of the second state in the event the selected largest slowness metric was generated by a node other than said respective member node which is a repair head; and forwarding to the repair head of the respective member node which is a repair head, the selected slowness metric and the generated subtree flag.

7. The method of claim 1 wherein said method further comprises:

transmitting a second pruning signal to at least one of said member node repair heads in response to receipt by said sending node of an indication of congestion at a member node at a time when the sending node is transmitting at said minimum acceptable data transmission rate;

in response to receipt of said second pruning signal at at said at least one of said member node repair heads, pruning from said multicast group each child of the respective member node repair head that forwarded to the respective member node repair head a slowness metric having a predetermined relationship with respect to said one of said generated slowness metrics and a subtree flag of said first state.

8. The method of claim 7 wherein said second pruning signal transmitting step comprises the step of multicasting said second pruning signal to at least said member node repair heads.

9. The method of claim 7 wherein said second pruning signal transmitting step further includes the step of transmitting to said at least one of said member node repair heads said one of said generated slowness metrics.

10. The method of claim 7 wherein said second pruning signal transmitting step comprises the step of multicasting to said at least one of said member node repair heads, said second pruning signal and said one of said generated slowness metrics.

11. The method of claim 7 wherein said one of said generated slowness metrics comprises the largest of said generated slowness metrics.

12. The method of claim 11 wherein said pruning step comprises the step of pruning from said multicast group each child of the respective member node repair head that forwarded to the respective member node repair head a slowness metric which is greater than or equal to said largest of said generated slowness metrics minus a predetermined tolerance.

13. The method of claim 11 wherein said pruning step comprises the step of pruning from said multicast group each child of the respective member node repair head that forwarded to the respective member node repair head a slowness metric which is greater than said largest of said generated metrics minus a predetermined tolerance.

14. The method of claim 1 wherein said selectively propagating step comprises the step of selectively propagating one of said generated slowness metrics and the associated subtree flag to the respective repair head in a flow control message.

15. The method of claim 14 wherein said flow control message comprises an ACK/NACK message.

16. A method for pruning a child of a repair head in a multicast group, wherein the multicast group includes a sending node and member nodes, wherein said multicast group is organized as a repair tree in which said repair head comprises one said member nodes and wherein another one other member nodes comprises a child of said repair head within said repair tree, said method comprising:

receiving at said repair head from said child, (i) a slowness metric generated by one of said member nodes, wherein said slowness metric is indicative of the inability of the member node that generated the slowness metric to correctly receive multicast packets at a data transmission rate employed by the sending node and (ii) a subtree flag indicating whether said child generated said slowness metric;

detecting at said repair head a signal that indicates that pruning should be initiated and receiving at said repair head an observed slowness metric associated with one of said member nodes that is least able to correctly receive data packets at said data transmission rate;

pruning said child of said repair head from said multicast group in the event that the slowness metric received from said child has a predetermined relationship with respect to said observed slowness metric and said subtree flag indicates that said child generated the slowness metric received at said repair head from said child.

17. The method of claim 16 wherein said detecting step comprises the step of detecting said signal at said sending node.

18. The method of claim 16 wherein said detecting step comprises the step of detecting said signal at a repair head other than said sending node.

19. The method of claim 18 wherein said pruning signal detecting step includes the the steps of receiving at the respective repair head from said sending node a data packet that includes said indicating that pruning should be initiated and said step of receiving said observed slowness metric comprises the step of receiving said observed slowness metric in said data packet.

20. The method of claim 16 wherein said observed slowness metric is the largest slowness metric generated by one of said member nodes of said multicast group.

21. The method of claim 20 wherein said pruning step comprises the step of pruning from said multicast group said child of said repair head in the event said slowness metric received from said child is greater than or equal to said largest slowness metric minus a predetermined tolerance.

22. The method of claim 20 wherein said pruning step comprises the step of pruning from said multicast group said child of said repair head in the event the slowness metric received from said child is greater than said largest slowness metric minus a predetermined tolerance.

23. A method for pruning multicast group members within a multicast group comprising a sending node and member nodes wherein said sending node is operative to transmit multicast data packets to said member nodes and said sending node and selected ones of said member nodes are organized as a repair tree and comprising repair heads of said repair tree, wherein each of said repair heads has respective child nodes, said method comprising:

generating a slowness metric at each of said member nodes indicative of the respective member nodes inability to receive multicast data packets at a data transmission rate employed by the sending node;

at each member node comprising a repair head, receiving a slowness metric and a subtree flag from each one of the children of the respective node, wherein the subtree flag is of a first state indicating that the slowness metric was generated by the respective child of the respective repair head and a second state indicating that the slowness metric was not generated by the respective child of that repair head;

at each member node comprising a repair head generating a list of the slowness metrics received from the respective node's children along with the respective nodes own slowness metric along with the subtree flags received from the respective children of the respective member node repair head;

at each member node comprising a repair head selecting the largest slowness metric within said list and forwarding the selected metric to the repair head of said member node repair head along with a subtree flag of said first state in the event said member node repair head generated said largest slowness metric and otherwise a subtree flag of said second state;

receiving at said sending node slowness metrics and subtree flags from the children of said sending node, wherein at least one of said received slowness metrics comprises a largest observed slowness metric generated by at least one of said member nodes;

propagating an indication of congestion detected at at least one of said member nodes up the repair tree for receipt by said sending node;

in the event said indication of congestion is received by said sending node at a time when said sending node is permitted to transmit at a minimum acceptable data transmission rate:

generating a first pruning signal at said sending node and transmitting a second pruning signal from said sending node to at least said member node repair heads;

in response to recognition of said first pruning signal at said sending node, pruning from said multicast group each child of said sending node that forwarded to said sending node a slowness metric which is related to said largest observed slowness metric by a predetermined criteria and which has an associated subtree flag of said first state; and in response to recognition of said second pruning signal at at least one of said member node repair heads, pruning from said multicast group each child of the respective member node repair head that forwarded to the resepctive member node repair head a slowness metric which is related to said largest observed slowness metric by a predetermined criteria and which has an associated subtree flag of said first state.

24. A computer data signal, said computer data signal including a computer program for use in pruning a child node of a repair head within a repair tree of a multicast group, wherein said multicast group includes a sending node and a plurality of member nodes for receiving multicast messages from said sending node, wherein said multicast group is organized as said repair tree, and wherein said repair head and said child of said repair head comprise selected ones of said plruality of member nodes, said computer program comprising:

program code for receiving at said repair head from said child, a slowness metric generated by one of said member nodes, wherein said slowness metric is indicative of the ability of the member node that generated the slowness metric to correctly receive multicast packets at the transmission rate employed by the sending node and a subtree flag indicating whether said child generated said slowness metric;

program code for receiving at said repair head a message that includes a pruning signal indicating that pruning should be initiated and a largest observed slowness metric corresponding to the largest slowness metric generated within said multicast group;

program code operative to prune said child of said repair head from said multicast group in the event that the slowness metric received from said child has a predetermined relationship with respect to said largest observed slowness metric and said subtree flag indicates that said child generated the slowness metric received at said repair head from said child.

25. A computer program product including a computer readable medium, said computer readable medium having a computer program stored thereon, said computer program for execution in a processor and for use in pruning a child node of a repair head within a repair tree of a multicast group, wherein said multicast group includes a sending node for multicasting data packets and a plurality of member nodes for receiving said multicast data packets from said sending node, wherein said multicast group is organized as said repair tree, and wherein said repair head and said child of said repair head comprise selected ones of said plruality of member nodes, said computer program comprising:

program code for receiving at said repair head from said child, a slowness metric generated by one of said member nodes, wherein said slowness metric is indicative of the ability of the member node that generated the slowness metric to correctly receive multicast packets at the transmission rate employed by the sending node and said program code for receiving a subtree flag indicating whether said child generated said slowness metric;

program code for receiving at said repair head a message that includes a pruning signal indicating that pruning should be initiated and a largest observed slowness metric corresponding to the largest slowness metric generated within said multicast group;

program code operative to prune said child of said repair head from said multicast group in the event that the slowness metric received from said child has a predetermined relationship with respect to said largest observed slowness metric and said subtree flag indicates that said child generated the slowness metric received at said repair head from said child.

26. Apparatus for pruning a child node of a repair head within a repair tree of a multicast group, wherein said multicast group includes a sending node for multicasting data packets and a plurality of member nodes for receiving said multicast data packets from said sending node, wherein said multicast group is organized as said repair tree, and wherein said repair head and said child of said repair head comprise selected ones of said plruality of member nodes, said computer program comprising:

means for receiving at said repair head from said child, a slowness metric generated by one of said member nodes, wherein said slowness metric is indicative of the ability of the member node that generated the slowness metric to correctly receive multicast packets at the transmission rate employed by the sending node and said program code for receiving a subtree flag indicating whether said child generated said slowness metric;

means for receiving at said repair head a message that includes a pruning signal indicating that pruning should be initiated and a largest observed slowness metric corresponding to the largest slowness metric generated within said multicast group;

means operative to prune said child of said repair head from said multicast group in the event that the slowness metric received from said child has a predetermined relationship with respect to said largest observed slowness metric and said subtree flag indicates that said child generated the slowness metric received at said repair head from said child.

* * * * *